United States Patent [19]

Ishikawa et al.

[11] Patent Number: 5,138,910
[45] Date of Patent: Aug. 18, 1992

[54] ELECTRICAL CABLE STRIPPING METHOD AND STRIPPING DEVICE

[75] Inventors: Suminori Ishikawa, Yokkaichi; Shigeharu Suzuki, Suzuka, both of Japan

[73] Assignee: Sumitomo Wiring Systems, Ltd., Mie, Japan

[21] Appl. No.: 799,526

[22] Filed: Nov. 27, 1991

[30] Foreign Application Priority Data

Nov. 28, 1990 [JP] Japan .................. 2-331248

[51] Int. Cl.$^5$ .................................. H02G 1/12
[52] U.S. Cl. ........................ 81/9.51; 29/825; 29/33 M; 29/564.4
[58] Field of Search ............ 81/9.51, 9.4, 9.41, 81/9.42, 9.43; 29/825, 867, 33 M, 564.4, 745, 747, 748

[56] References Cited

U.S. PATENT DOCUMENTS 4,942,789 7/1990 Hoffa et al. .................... 81/9.51

FOREIGN PATENT DOCUMENTS 0187161 10/1956 Fed. Rep. of Germany ....... 81/9.51
58-14654 3/1983 Japan ........................... 81/9.51
60-51714 4/1985 Japan ........................... 81/9.51

Primary Examiner—Roscoe V. Parker
Attorney, Agent, or Firm—Sughrue, Mion, Zinn, Macpeak & Seas

[57] ABSTRACT

An electrical cable stripping device is disclosed for stripping an end outside coating of an electrical cable to form an exposed conductor part having a resistance wire wrapped around a flexible core. The device includes clamping member for clamping an intermediate portion of the electrical cable, a stripping knife operatively provided to insert knife edges halfway to the electrical cable at a position between the clamped point and the end of the electrical cable to cut the end outside coating, a moving device for moving the stripping knife, while maintaining the sme at the closed position, away from said clamping member to strip the end outside coating and to expose the conductor part. At least the resistance wire is extended between the end outside coating and the exposed conductor part. Further provided is a wire cuter for cutting the exposed conductor part.

4 Claims, 6 Drawing Sheets

ELECTRICAL CABLE STRIPPING METHOD AND STRIPPING DEVICE

BACKGROUND OF THE INVENTION

1. Field of the Invention

The present invention relates to an electrical wire insulation stripping method and stripping device suited to use with electrical wires of wound wire type used for automotive ignition cables.

2. Description of the Prior Art

Figure 6:
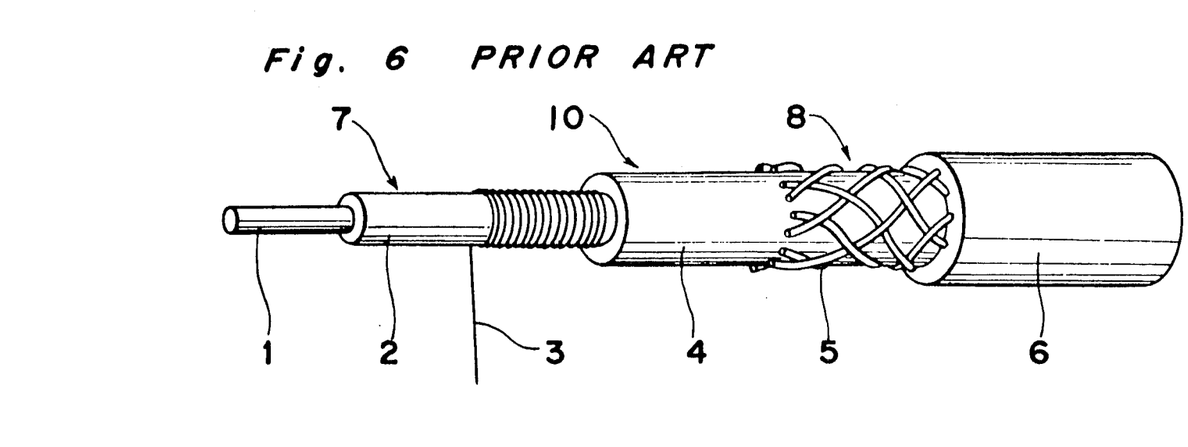
FIG. 6 is a cut-away view of the structure of a conventional wrapped electrical cable.

Conventional ignition cable used in the ignition circuit of an automobile is a wound shielded cable, which as shown in FIG. 6 has a tension member 1 core of an aramid or other polymer fiber covered successively with a silicon rubber and ferrite powder composition insulation layer 2, a layer of wire 3 having a predetermined electric resistance and made of stainless steel or another metal alloy wrapped in a spiral pattern around the insulation layer 2, an insulation layer 4 of an EP rubber or other composition covering the outside of the wound resistance wire 3, a braiding 5 of glass fiber formed around the insulation layer 4, and a sheath 6 of silicon rubber wrapped around the outside of the braiding 5. Cables of this type have been described in Japanese Utility Model Publication (examined) H1-32253.

A flexible wrapped core 7 is formed by the tension member 1 and the silicon insulation layer 2, and an outside coating 8 is formed by the insulation layer 4, braiding 5, and the sheath 6 to insulate the resistance wire 3.

The conventional procedure followed to connect this wound electrical wire 10 to a terminal connector is described below with reference to FIGS. 7A to 7D.

Figure 7A:
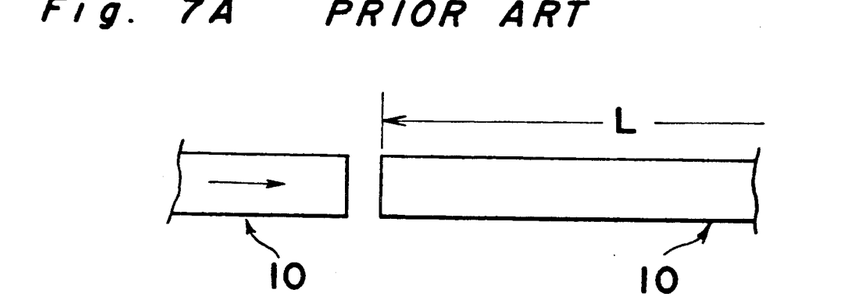
FIGS. 7A to 7D are diagrams used to illustrate the major parts of a conventional terminal connecting process.

As shown in FIG. 7A, a predetermined length L of the wound electrical wire 10 supplied from a coiled drum is first cut (the cutting step).

Figure 7B:
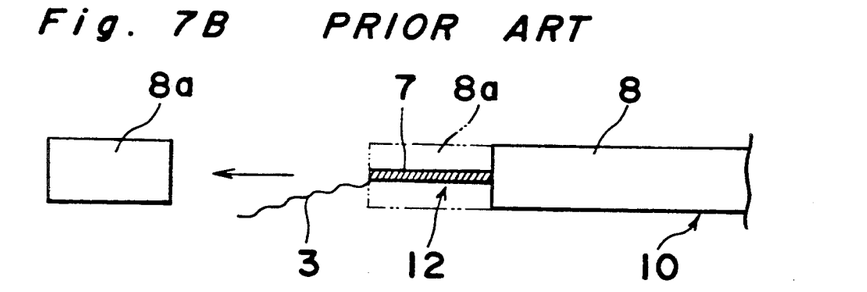

Next, as shown in FIG. 7B, the end outside coating 8a at the end of the electrical wire 10 is stripped off, forming the stripped resistor 12 in which the resistance wire 3 is exposed (the stripping step). When stripping the end outside coating 8a, the frictional resistance and drag acting between the end outside coating 8a and the resistance wire 3 due to the wrapping of the resistance wire 3 around the flexible core 7 causes the resistance wire 3 wrapped around the flexible core 7 to unravel as the end outside coating 8a moves lengthwise along the electrical wire 10.

Figure 7C:
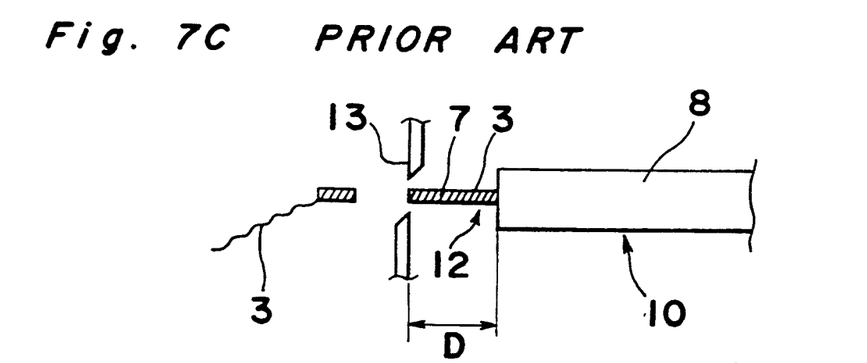

Then as shown in FIG. 7C, the resistance wire 3 and flexible core 7 are cut by conductor cutting knives 13 to leave a stripped resistor 12 of a predetermined length D (the conductor cutting step), removing the unravelled part of the resistance wire 3 by removing the excess length of the stripped resistor 12.

Figure 7D:
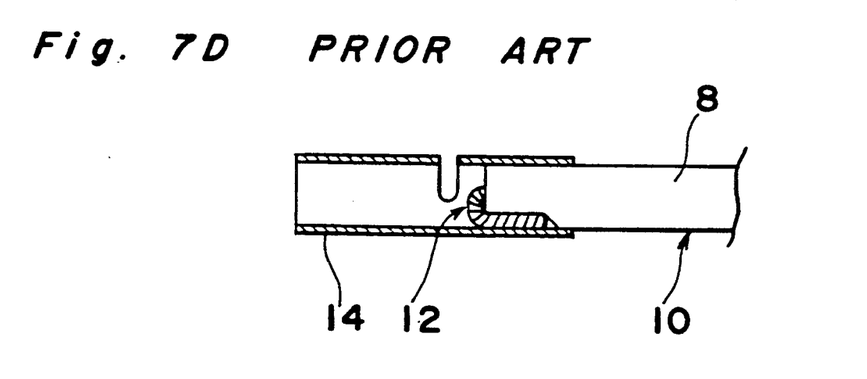
Figure 8:
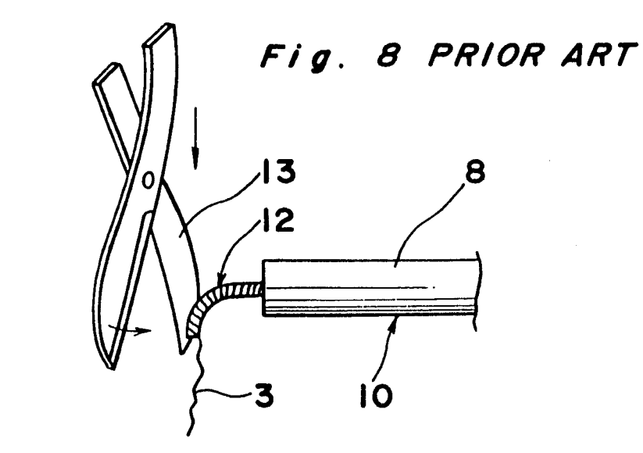
FIG. 8 is a perspective view of a cutting error.
Figure 9:
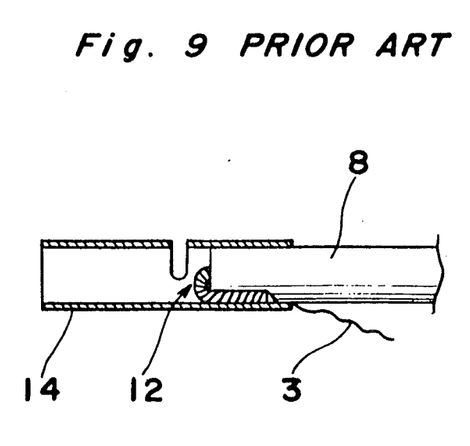
FIG. 9 is a diagram of an improperly cut electrical cable with a terminal connector connected thereto.

Then as shown in FIG. 7D, the stripped resistor 12 is bent to the outside circumference side of the sheath 6 and an electrical connection is made between the resistance wire and the terminal connector 14 by crimping the terminal connector 14 to hold the bent part of the stripped resistor 12 (the connector crimping step), thus completing connection of the terminal connector 14 to the electrical wire 10.

A terminal connector 14 is also connected to the other end of the wound electrical wire 10 in the same way.

However, when the outside coating 8 is stripped from the electrical wire 10 to connect the terminal connector 14 as described above, the next step after the stripping step is completed is the conductor cutting step. Because only the electrical wire 10 side of the stripped resistor 12 is supported during the conductor cutting step as shown in FIG. 7C, the softness and flexibility of the flexible core 7 makes the stripped resistor 12 sag in an unstable manner; this makes it difficult to cut the stripped resistor 12 in a straight line, normally resulting in a certain amount of sag or bending. Depending upon the degree and direction of this sag or bending, the conductor cutting knives 13 contact the stripped resistor 12 when lowered to the cutting position in the conductor cutting step, increasing the bend in the stripped resistor 12 and causing the stripped resistor 12 to escape from the cutting position. The cutting operation of the conductor cutting knives 13 in this state does not cut the stripped resistor 12, thus resulting in problems caused by the non-removal of the unravelled part of the resistance wire 3.

If the connector is crimped with the unravelled part of the resistance wire 3 present, the unravelled resistance wire 3 will extend outside the sheath 6 and the terminal connector 14. When the assembled wire and connector is then assembled to the distributor cap for the spark plugs, the unravelled end of the resistance wire 3 may be pulled farther out. This may cause current leakage from the unravelled resistance wire 3 and contribute to engine trouble when the cable is then used as an ignition cable in a motor vehicle.

SUMMARY OF THE INVENTION

Therefore, an object of the present invention is to provide an electrical cable stripping method and stripping device which more positively remove the unravelled part of the resistance wire 3 when forming a stripped resistor 12 of a specified length.

To achieve this object, an electrical cable stripping method which strips the outside coating on the cable end to form an exposed conductor part on a wrapped electrical wire comprising a resistance wire wrapped around a flexible wrapped core and an outside coating on the outside circumference of the wrapped resistance wire layer is proposed; according to said stripping method, the outside coating on the electrical cable end is cut in a direction intersecting with the lengthwise direction of the electrical cable, the end insulation is then stripped off in the lengthwise direction of the cable, and the resistance wire and wrapped core are cut at a position from which the end insulation was stripped before the end insulation is completely separated from the resistance wire to form the exposed resistance wire part.

To achieve the above method, a stripping device which strips the outside coating on the cable end to form an exposed conductor part on a wrapped electrical wire comprising a resistance wire wrapped around a flexible wrapped core and an outside coating on the outside circumference of the wrapped resistance wire layer according to the present invention comprises a stripping knife which moves freely to and from the outside coating layer of the electrical cable end in a direction intersecting with the lengthwise direction of the electrical cable to cut the insulation layer, an outside coating stripping mechanism which moves the stripping knives with the stripping knives in the cutting position lengthwise along the electrical cable, and a cutting mechanism which moves freely at a position from which the end outside coating is stripped to cut the resistance wire and wrapped core before the end outside coating is completely removed from the resistance wire side by the movement of the stripping knives lengthwise along the electrical cable.

When the end of the electrical wire is stripped by the method according to the present invention, because the resistance wire and the wrapped core are cut at a predetermined position where the end outside coating is already stripped before the end outside coating is completely removed from the resistance wire side, i.e., during the stripping process wherein the end outside coating is pulled in the stripping direction, the exposed resistance wire part to be cut on the stripped side of the end outside coating is held on the end outside coating side and the main cable side, i.e., is held on both sides, the exposed resistance wire part is cut in a stable, approximately straight, supported state, and is cut reliably at the predetermined position.

Furthermore, when the stripping knives of the outside layer stripping mechanism are extended and cut the outside layer, and are then moved lengthwise to the cable towards the near end with the knives in the cutting position according to the stripping device of the present invention, the end outside coating is stripped away. Then, before the end outside coating is completely separated from the resistance wire side, i.e., during the pulling of the end outside coating in the stripping direction, the cutting mechanism operates to cut the resistance wire and the wrapped core at a predetermined position from which the end outside coating is stripped.

At this time because the exposed resistance wire part to be cut on the stripped side of the end outside coating is held on the end outside coating side and the main cable side, i.e., on both sides, the exposed resistance wire part is cut in a stable, approximately straight, supported state, and it is possible to cut reliably at the predetermined position.

BRIEF DESCRIPTION OF THE DRAWINGS

The present invention will become more fully understood from the detailed description given below and the accompanying drawings wherein:

FIGS. 1A, 1B, 1C, and 1D to FIG. 5 are diagrams used to describe the present invention, FIGS. 1A, 1B, 1C, and 1D being explanatory illustrations of the operating sequence of the stripping process, FIG. 2 a perspective view of major components, FIG. 3 an enlarged view of the major components in the conductor cutting process, FIG. 4 a simplified view of a terminal connecting machine provided with a stripping device according to the present invention, and FIG. 5 an enlarged view of the major components in the conductor cutting step of an alternative embodiment;

DESCRIPTION OF PREFERRED EMBODIMENTS

The preferred embodiment of an electrical cable stripping method and a stripping device according to the present invention are described hereinbelow with reference to the accompanying figures.

Figure 4:
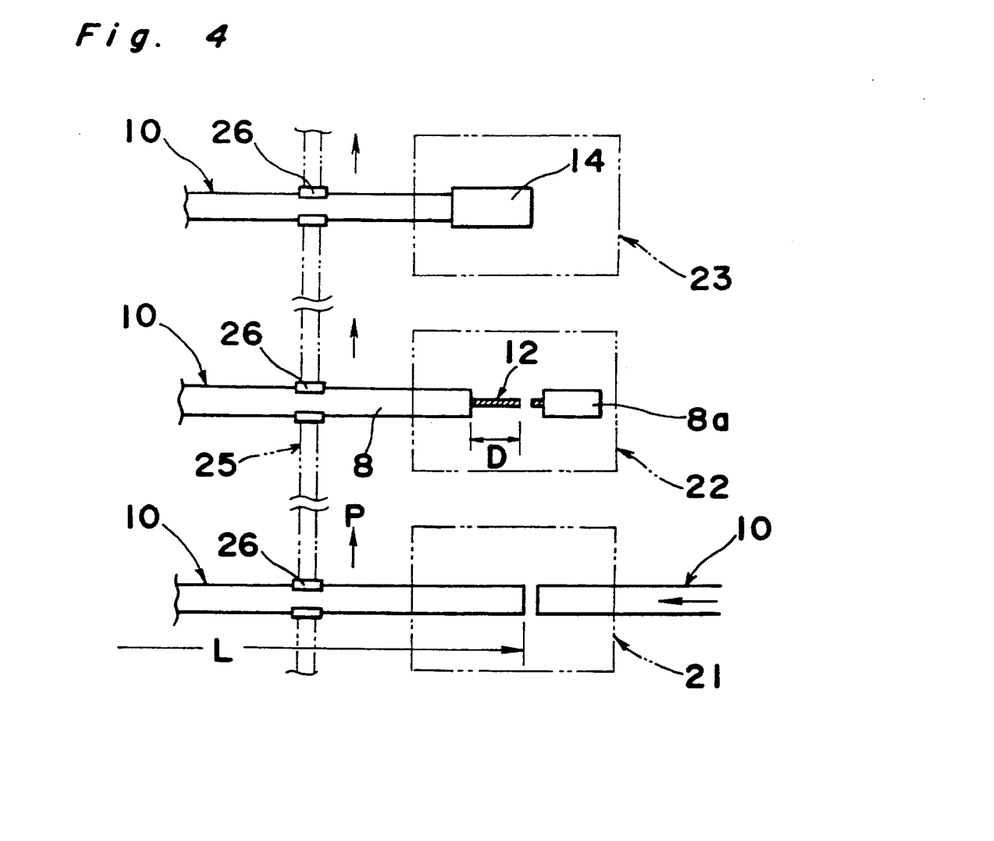

FIG. 4 is a simplified diagram of a terminal connector mounting device which connects a terminal connector 14 to a wound electrical wire 10 such as a shielded cable for automotive use. As shown in FIG. 4, this device comprises a wire cutting station 21 to cut the wound electrical wire 10 supplied from a wound drum to a predetermined length L, a stripping and cutting station 22 which strips the end of the electrical wire 10 and cuts the stripped resistor 12 at a predetermined position to form a stripped resistor 12 of a predetermined length D, and a connector crimping station 23 which connects the terminal connector 14 to the end of the electrical wire 10. The device also comprises a conveyor 25, which is a chain or a belt formed in a loop and driven intermittently in a circular path, and conveyor clamp pairs 26 which can open and close freely and are placed at specific intervals lengthwise along the conveyor 25.

It is to be noted that in FIG. 4, only one side of the terminal connecting device is shown. The other side of the terminal connecting device similarly comprises a stripping and cutting station 22 to strip and cut the other end of the wound electrical wire 10, connector crimping station 23 to connect the terminal connector 14, and a conveyor 25.

Both ends of the electrical wire 10 cut to the predetermined length L are clamped by the conveyor clamps 26, after which the electrical wire 10 is carried on the loop path of the conveyor 25 in a predetermined direction P to the stripping and cutting station 22 and then to the connector crimping station 23 for processing. The conveyor clamps 26 are then opened by an extractor not shown in the figures, and the completed electrical wire 10 with the attached terminal connector 14 is removed.

To the wire cutting station 21 and the connector crimping station 23 are mounted conventional wire cutting and connector crimping mechanisms. To the stripping and cutting station 22 is mounted the stripping device 28 according to the present invention.

Referring to FIGS. 1A to 1D and FIG. 2, the stripping device 28 according to the present invention comprises an outside coating stripping mechanism 29 to strip the outside coating 8 from the electrical wire 10, a cutting mechanism 30 to cut the resistance wire 3 and the flexible core 7, and a fixed clamp pair 31 which opens and closes freely to hold the end of the electrical wire 10 from both sides in a fixed position.

Figure 2:
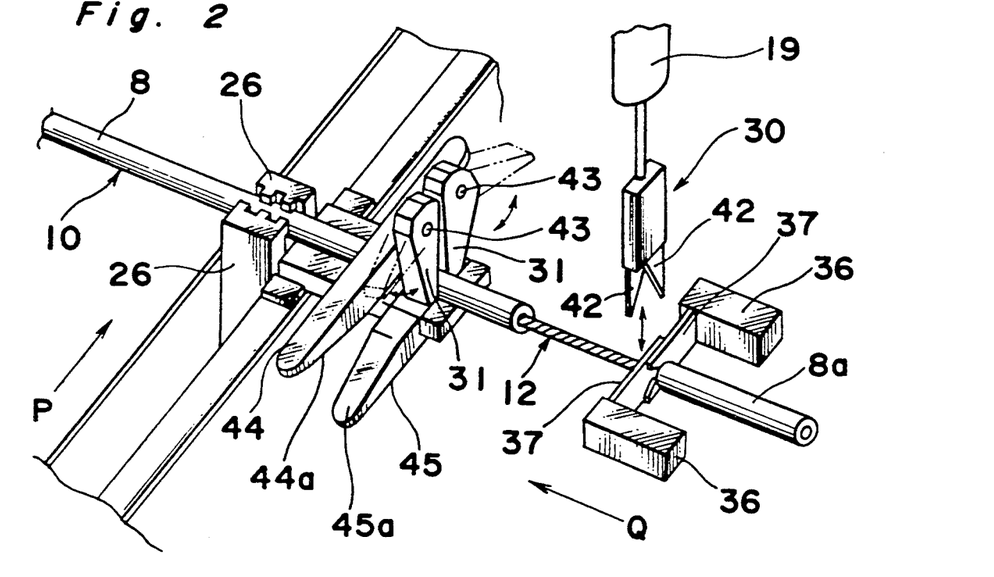
Figure 3:
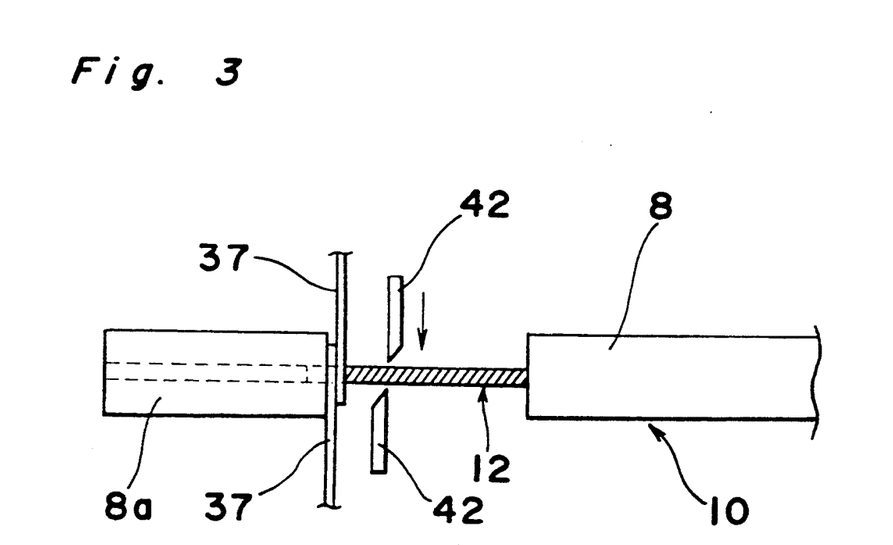

The outside coating stripping mechanism 29 comprises a mobile base 32 supported by a frame of the stripping device 28 to move freely in a direction Q intersecting the direction of travel P of the conveyor 25, and a drive cylinder 33, such as an air cylinder, having a reciprocating action, provided in a fixed position on the frame of the stripping device 28 with the piston rod 33a of the drive cylinder 33 connected to the mobile base 32 such that the reciprocating action of the piston rod 33a drives the mobile base 32 in direction Q.

Above one side of the mobile base 32 on the side close to the conveyor 25 is provided a guide frame 35 parallel to the conveyor direction P, and a pair of supports 36 are fit on the guide frame 35 to slide freely on the guide frame 35 parallel to the conveyor direction P. On the opposing faces of the supports 36 and on the side close to the conveyor 25 are provided a pair of stripping knives 37 with each knife opposite the other. At the top of the other side of the mobile base 32 is fixed an arm cylinder 38 driven by, for example, an air cylinder to move the supports 36 towards and away from each other. The piston rod 38a of the arm cylinder 38 and the supports 36 are connected by a link mechanism 39 such that the reciprocal action of the piston rod 38a drives the supports 36 along the guide frame 35 by means of the link mechanism 39, thereby opening and closing the opposing stripping knives 37 as the supports 36 move towards and away from each other. It is to be noted that the closed position of the supports 36 as established when supports 36 are moved towards each other can be adjusted by stoppers, and the closed position of the stripping knives 37 can thereby be adjusted.

The cutting mechanism 30 is supported on the frame of stripping device 28 by a lift mechanism such as an air cylinder 19 for raising and lowering, and comprises on the bottom end a pair of cutting blades 42 with the bottom end thereof spread open. By opening and closing the pair of cutting blades 42 in a manner of scissors by a drive mechanism (not shown in the figures), it is possible to cut the stripped resistor 12.

The fixed clamp pair 31 are pivotally supported at top ends thereof by pins 43. By operating a clamp operating mechanism (not shown in the figures), the clamp jaws pivot on the pins 43 so that the bottom ends of the jaws are free to open and close Near the fixed clamp pair 31 are provided an upper guide 44 to guide the electrical wire 10 to a predetermined height, and a lower guide 45. On the upstream side of the upper guide 44 and the lower guide 45 to the conveyor direction P are provided an upper guide face 44a descending with respect to the conveyor direction P and a lower guide face 45a ascending with respect to the conveyor direction P to define a pair of tapered faces narrowed towards the clamping position.

Next, the stripping method is described according to the operating sequence of the stripping device 28 described hereinabove.

The electrical wire 10 cut to a predetermined length L by the wire cutting station 21 is carried by the conveyor 25 to the stripping and cutting station 22. At this time the end of the electrical wire 10 is guided to a predetermined height by the upper and lower guides 44 and 45, and the conveyor 25 stops at a predetermined position. The stopping of the conveyor 25 is detected by a controller (not shown in the figures), which then causes the clamp operating mechanism to operate, closing the fixed clamp pair 31 from the open position to hold the electrical wire 10. The electrical wire 10 thus becomes immobile and is held secure at a predetermined position. At the same time, the drive cylinder 33 operates from the position shown in FIG. 1A to extend the piston rod 33a, thus moving the mobile base 32 forward toward the electrical wire 10 to the position shown in FIG. 1B.

Figure 1A:
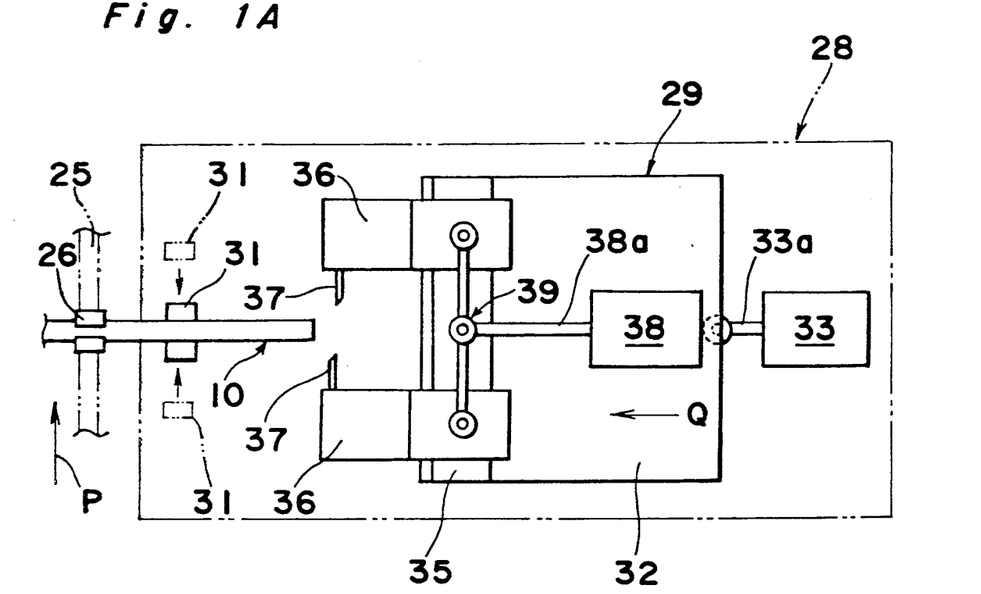
Figure 1B:
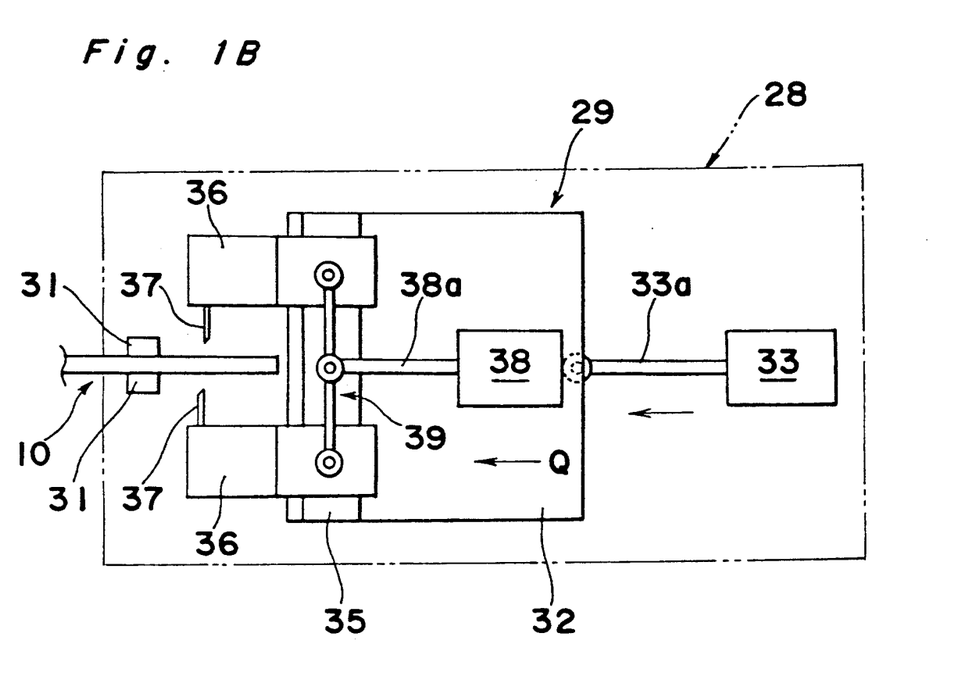
Figure 1C:
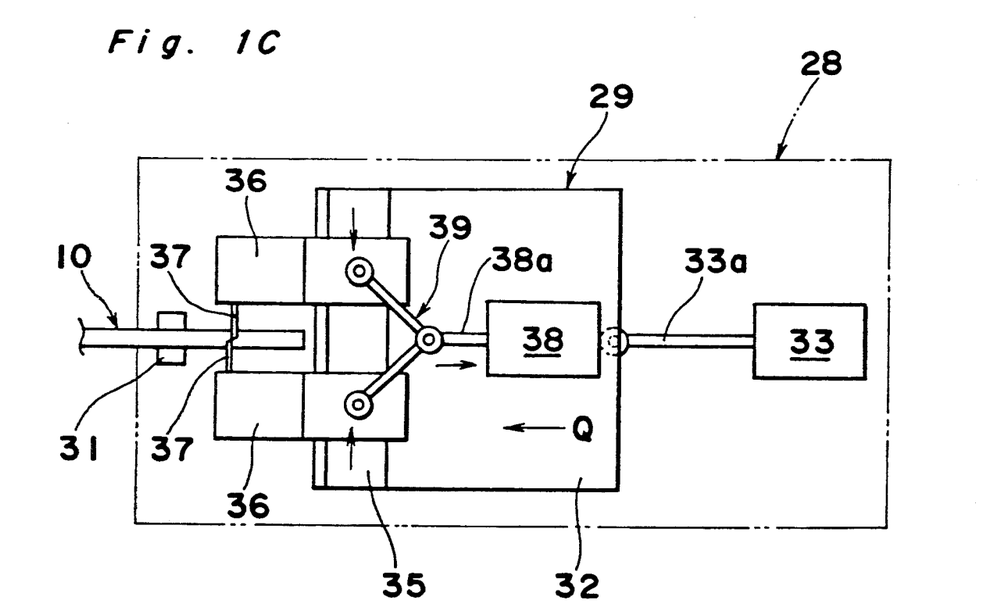

Upon detection of the extension of the piston rod 33a, the piston rod 38a of the arm cylinder 38 to retract, as shown in FIG. 1C to close the stripping knives 37. More specifically, contraction of the piston rod 38a causes the supports 36 to travel by means of the link mechanism 39 along the guide frame 35, thereby approaching each other and causing the stripping knives 37 to close from the open position (see FIG. 1C) and cut the outside coating 8 at the end of the wound electrical wire 10 in a direction intersecting the lengthwise direction of the electrical wire 10.

Figure 1D:
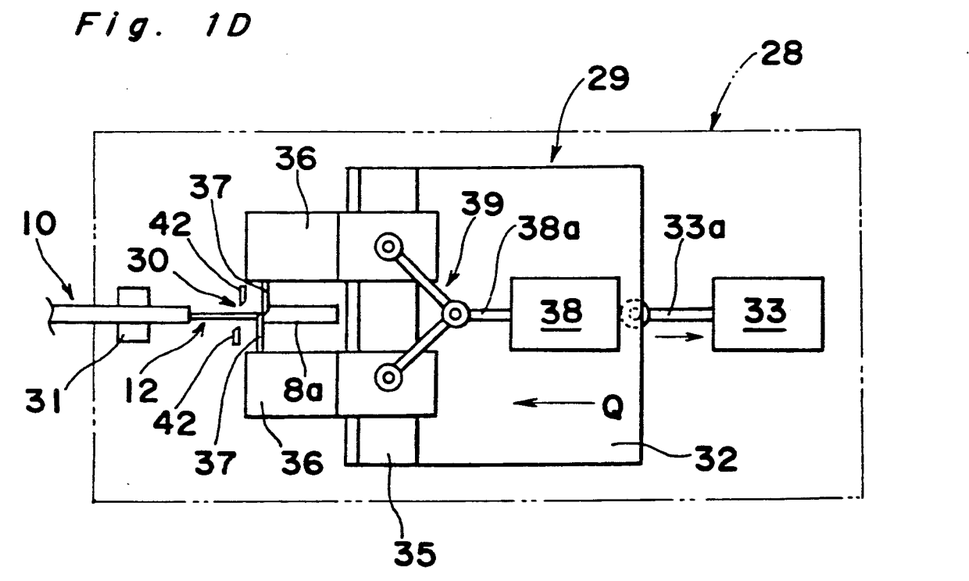

After the retraction of the piston rod 38a for a predetermined distance as detected by a controller, the piston rod 33a of the drive cylinder 33 retracts a predetermined length (FIG. 1D). Thus, the end outside coating 8a is separated from the electrical wire 10 and is pulled off by the retraction of the stripping knives 37 in the lengthwise direction of the electrical wire 10 (the stripping step). At the retracted position of the piston rod 33a, the end outside coating 8a is not completely separated from the flexible core 7 and the resistance wire 3, so that the end of the flexible core 7 and the resistance wire 3 remain covered by the end outside coating 8a.

Next, when the piston rod 33a is retracted for a predetermined distance as detected by a controller, the lift mechanism is operated to shift down the cutting mechanism 30, thus lowering the pair of cutting blades 42 on the cutting mechanism 30 to the predetermined cutting positions at both sides of the stripped resistor 12 (FIG. 1D). When the shifted down position of the cutting mechanism is detected, the pair of cutting blades 42 are closed from the open position, thereby cutting the resistance wire 3 and the flexible core 7 (conductor cutting step) at the position to which the end outside coating 8a is stripped and forming a stripped resistor 12 of a predetermined length D.

After closing the pair of cutting blades 42, the outside coating stripping mechanism 29, cutting mechanism 30, and fixed clamp pair 31 each returns to the start position, and the conveyor 25 advances in the conveyor direction P to carry the stripped electrical wire 10 to the connector crimping station 23.

As described hereinabove, the electrical cable stripping method according to the present invention is arranged such that the resistance wire 3 and flexible core 7 are cut at a position from which the end outside coating 8a is already stripped during the pulling of the end outside coating 8a in the stripping direction. Thus, during the cutting, the stripped exposed resistor 12 is held at both sides of the cutting point, i.e., at the electrical wire 10 side and the end outside coating 8a side. Also, the stripped exposed resistor 12 is held with tension applied in the lengthwise direction of the electrical wire 10. Accordingly, the stripped resistor 12 can be cut in a stable, approximately straight position, and can be cut reliably at a predetermined position, and the unravelled part of the resistance wire 3 can be reliably removed.

Furthermore, because the stripping step and conducting cutting step are performed at the same position almost simultaneously, productivity is increased and the overall equipment size can be made more compact because the equipment for these steps is installed at the same station 22.

Figure 5:
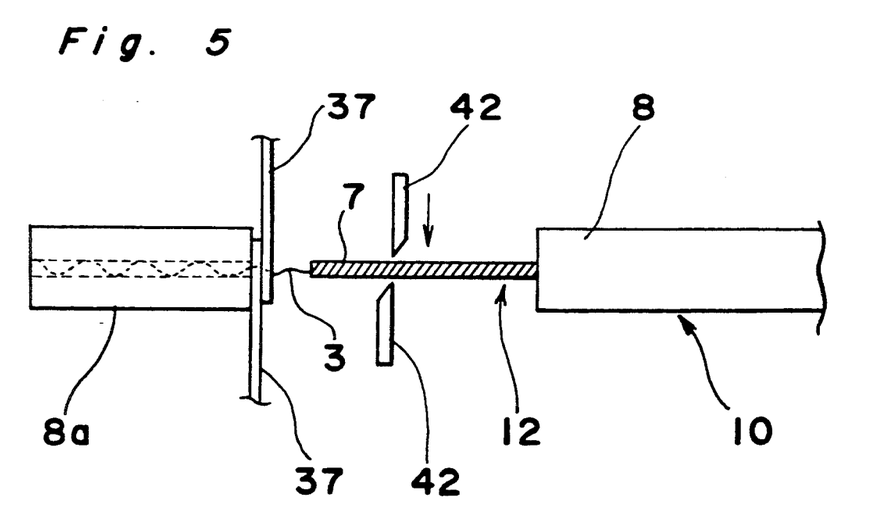

It is to be noted that in the end outside coating 8a stripping step the conductor cutting step may be positioned as shown in FIG. 5, such that the end outside coating 8a is completely separated from the flexible core 7 but the unravelled resistance wire 3 is still bridging between the end outside coating 8a and the flexible core 7. Because the stripped resistor 12 is supported at both ends at this time, sagging and bending of the stripped resistor 12 can be effectively prevented, and the stripped resistor 12 can be reliably cut.

As will be known from the above description, because the resistance wire and wrapped core are cut at a stripped position in the stripping process of the end outside coating in the electrical cable stripping method and stripping device according to the present invention, the resistance wire and wrapped core on the wire side of the cut are supported at both ends thereof, thereby enabling these to be cut in a stable, approximately straight position, preventing cutting errors, and reliably removing the unravelled part of the resistance wire.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

WHAT IS CLAIMED IS:

1. An electrical cable stripping method for stripping an end outside coating of an electrical cable to form an exposed conductor part having a resistance wire wrapped around a flexible core, said method comprising the steps of:
   clamping an intermediate portion of said electrical cable by a clamping means;
   closing a stripping knife means to insert knife edges halfway to said electrical cable at a position between the clamped point and the end of the electrical cable to cut said end outside coating;
   moving said stripping knife means, while maintaining the same at the closed position, away from said clamping means to strip said end outside coating and to expose said conductor part, at least said resistance wire being extended between said end outside coating and said exposed conductor part; and
   closing a wire cutting means to cut said exposed conductor part.

2. An electrical cable stripping method as claimed in claim 1, wherein said moving step moves said stripping knife means for a predetermined distance so that said end outside coating is still coupled to said exposed conductor part.

3. An electrical cable stripping device for stripping an end outside coating of an electrical cable to form an exposed conductor part having a resistance wire wrapped around a flexible core, said device comprising:
   clamping means for clamping an intermediate portion of said electrical cable;
   stripping knife means operatively provided to insert knife edges halfway to said electrical cable at a position between the clamped point and the end of the electrical cable to cut said end outside coating;
   moving means for moving said stripping knife means, while maintaining the same at the closed position, away from said clamping means to strip said end outside coating and to expose said conductor part, at least said resistance wire being extended between said end outside coating and said exposed conductor part; and
   wire cutting means for cutting said exposed conductor part.

4. An electrical cable stripping device as claimed in claim 3, wherein said moving means moves said stripping knife means for a predetermined distance so that said end outside coating is still coupled to said exposed conductor part.

* * * * *